United States Patent [19]

Jacob

[11] 3,727,006

[45] Apr. 10, 1973

[54] MULTI-STAGE TIME CONNECTION NETWORK

[75] Inventor: Jean-Baptiste Jacob, Kertanguy, France

[73] Assignee: C. I. T. Compagnie Industrielle Des Telecommunications, France

[22] Filed: Feb. 10, 1971

[21] Appl. No.: 114,250

[30] Foreign Application Priority Data

Feb. 10, 1970 France..................................7004661

[52] U.S. Cl................................179/18 GF, 179/18 J

[51] Int. Cl................................................H04q 11/04

[58] Field of Search......................179/15 AQ, 18 GF, 179/18 J

[56] References Cited

UNITED STATES PATENTS

| | | | |
|---|---|---|---|
| 3,458,658 | 7/1969 | Ard | 179/15 AQ |
| 3,586,784 | 6/1971 | Bhusri | 179/18 GF |
| 3,129,407 | 4/1964 | Paull | 179/18 GF |
| 3,617,643 | 11/1971 | Nordquist | 179/15 AQ |
| 3,221,102 | 11/1965 | Merz | 179/15 AQ |

*Primary Examiner*—Ralph D. Blakeslee
*Assistant Examiner*—David L. Stewart
*Attorney*—Craig, Antonelli, Stewart & Hill

[57] ABSTRACT

Test device comprising a central memory storing a record of the engaged states of the paths in a multi-stage switching network, consisting more particularly of a single memory block for two connection networks whose intermediate switches can receive data from the input switches of any of the networks, whereas they can transmit the said data only to the output switches of the network to which they belong.

6 Claims, 10 Drawing Figures

INVENTOR:

JEAN-BAPTISTE JACOB

BY Craig, Antonelli, Stewart & Hill

ATTORNEYS

MULTI-STAGE TIME CONNECTION NETWORK

The present invention relates to a path testing device which is usable particularly in an automatic telecommunication multi-stage time connection network.

In a first U.S. application Ser. No. 50,692, filed by applicant on June 29, 1970, a time connection network has been described which comprises an input stage, an intermediate stage and an output stage. In the case of a non-blocking network, the input stage comprises $n$ switches to CE1 to CE$n$ with $n$ inputs and $(2n-1)$ outputs; the intermediate stage comprises $(2n-1)$ intermediate switches CI1 to CI$(2n-1)$ with $n$ inputs and $n$ outputs, and the output stage comprises, like the input stage, $n$ switches CS1 to CS$n$, each switch having $(2n-1)$ inputs and $n$ outputs. Each of the $(2n-1)$ outputs of an input switch CE1, for example, is connected by means of a network of links to one input of each of the $(2n-1)$ intermediate switches and, analogously, each of the $(2n-1)$ inputs of an output switch, CS1 for example, is connected by means of a network of links to one output of each of the $(2n-1)$ intermediate switches.

It was equally apparent from the aforementioned U.S. application Ser. No. 50,692 that each input, intermediate and output switch had an analogous internal structure. For example, for a blocking-type network, in the particular case in which the switches have a square configuration servicing 32 network lines and are of the same type, 32 incoming network lines LRE1 to LRE32 on the input switch CE1 terminate in 32 input registers REE1 to REE32; and the buffer memory MTE1 consists of 32 blocks or elementary memories each comprising 32 words with eight binary elements. Since the elementary memories are addressable memories, the control memory MCE1 comprises 1024 words, as the buffer memory, but with 10 binary elements. These 1024 words also constitute 32 blocks of 32 words, to each block being associated one output register RSE1 to RSE32 and from each output register extending one intermediate network line LREI1 to LREI32 toward the input registers of the intermediate switches.

It was further apparent from the aforementioned U.S. Pat. application Ser. No. 50,692 that, in order to establish a connection or linkage between an input switch and an output switch, it was necessary to find an intermediate switch having a free time channel on the intermediate incoming network line, connecting it to the input switch, as well as a free time channel on the intermediate outgoing network line connecting it to the output switch. In order to carry out this search for a free path, one utilizes a central memory to store the states of engagement or occupancy of the intermediate network lines whose capacity must be at least $2n$ words with 32 binary elements each per intermediate switch.

In a general fashion, the structure of a time connection network always comprises an input stage, an intermediate stage, and an output stage. The input stage is formed or consists of a certain number $p$ of input time switches with $n$ inputs and $m$ outputs; the intermediate stage comprises $m$ switches (or $m$ intermediate time networks) with $p$ inputs and $q$ outputs, and the output stage consists of the same number $q$ of output time switches with $m$ inputs and $n$ outputs.

In a second U.S. application Ser. No. 90,285, filed by applicant on Nov. 17, 1970, there has been described a path testing device comprising a central memory which stores the conditions of occupancy, which make it possible to determine an available path between two points of a multi-stage time connection network, the central memory of the states of occupancy including a system for performing the logical functions of decision and control which, in permanent connection or linkage with a central calculator, orders and controls sequentially the operation of the different elements of the central memory.

It was further apparent from the above-mentioned second U.S. application that the central memory of or regarding the states of occupancy and of the associated or coordinated logical functions comprised several parts: (1) a system for performing the logical functions of decision and control or command; (2) an address register providing for the binary addressing of the switches to be connected; (3) an address decoder whose purpose it is to translate the binary address into the decimal system; (4) a block memory of two $(m \times p)$ words with 32 binary elements which corresponds to m intermediate switches, $p$ incoming or outgoing intermediate network lines, or 2 $(32 \times 32) = 2048$ words with 32 binary elements in the particular case of the network with 32 switches having 32 network lines; (5) a reading and writing register operatively connected with the memory; (6) a circuit for selecting the free time channel and for coding in the binary system the decimal order or sequency of the free time channel when a time channel is taken; and (7) a decoding and positioning circuit including a register of time channels having five binary stages for setting at either 1 or at 0 any one of the 32 binary elements which happen or are found to be in the reading and writing register of the memory when a time channel has been taken or released.

The central occupancy or engagement memory is employed, on the one hand, for the purpose of accelerating the path finding search, which is indispensable in large-capacity networks, and on the other hand, in order to make it possible by the simple reading of the occupancy memory to determine at any given instant the state of occupancy of the network, and still further in order to avoid using electronic linkages or connections at great speed and with a large number of linkages between the outputs of the control memories of all of the switches and a test circuit of zero in one word of the control memory, which circuit might constitute a possible path finding test circuit.

The central memory storing the states of occupancy and of the associated or coordinated logical functions not only enters into the path finding test for establishing a communication path, but also is used for the release of the occupied or busy path at the end of the communication. In the first case, one knows the input switch CE$i$ and the output switch CS$j$; it is thus necessary to find an intermediate switch CI$k$ having a free time channel (VT1) on the incoming network line (LREI$i$) and a free time channel (VT$m$) on the outgoing network line (LRSI$j$); thus, the path finding test consists in successively carrying out this analyzing operation on all of the intermediate switches starting from the first one. In the second case, one knows the numbers of the intermediate switches CT$k$ of the network lines LREI$i$ and LRSI$j$ and of the time channels VT1 and VT$m$ which form a particular path. Thus, to release a path, first one proceeds with the erasing in the control memories of the connection network, and thereafter with the erasing of the central occupancy memory of the time channels VT1 and VT*m* corresponding to the intermediate network lines.

In a third U.S. application Ser. No. 102,371, filed by applicant on Dec. 29, 1970, there has been described a device which renders it possible to double the capacity of a connection network by using two identical networks R1 and R2, each input switch of one network being connected on the one hand with the intermediate switches of this network, and on the other hand with the intermediate switches of the other network, in such a manner that any time channel whatever of any desired input switch may be connected to any desired time channel of any desired output switch.

It has also been rendered apparent in this third application that each intermediate switch comprises a first group or assembly consisting of a certain number of input registers and a buffer memory connected to a control memory and output registers, and a second group or assembly consisting of an input register-buffer memory combination identical to the first group or assembly, connected to this control memory and the output registers, wherein the control memory comprises one supplementary binary element per address word which it can record.

The present invention relates to a path finding test device for a multi-stage time connection network or system, this network or system consisting of two identical networks R1 and R2, each input switch of one of these networks R1 and R2 being connected, on the one hand, to the intermediate switches of this network or system and, on the other hand, to the intermediate switches of the other network or system; and this device is characterized in that the network R comprises a central memory storing the states of occupancy of the paths, as is the case in the first U.S. application Ser. No. 50,692, one half of the memory corresponding to the network R1, the other half corresponding to the network R2, this memory making it possible to determine an available path between any input and any output of the network R.

According to another characteristic of the present invention, the central memory comprises the same types of members as provided in the aforementioned second U.S. application, and particularly the memory block comprises, according to the present invention, two $pm$ words of 32 binary elements corresponding to two $p$ incoming network lines of each of the $2m$ intermediate switches as well as $2m{\cdot}q$ words of 32 binary elements corresponding to $q$ outgoing lines of each of the $2m$ intermediate switches; in the case of $n$ input, intermediate and output switches with $n$ incoming and outgoing network lines, the block memory comprises $4n32$ words, or $4 \times 32 \times 32 = 4096$ words for $n$ equal to 32.

There are two $pm$ words since there are $2p$ input switches present for the network R with m outputs each; although there are $2p$ incoming network lines in each of the $2m$ intermediate switches, one time channel of an outgoing network line of an input switch can be occupied or busy only once, though it has two possible directions of branching or being switched, namely R1 or R2.

The present invention will be further described hereinafter in connection with one embodiment thereof, given only by way of example, and taken in connection with the accompanying drawings, wherein FIG. 1*a* is a schematic diagram of a non-blocking connection network, such as described in the aforementioned first U.S. application, in which the present invention is used;

FIG. 1*b* is a schematic block diagram of a time connection network R composed of two networks R1 and R2;

Figures 4, 4A, 4B, 4C:
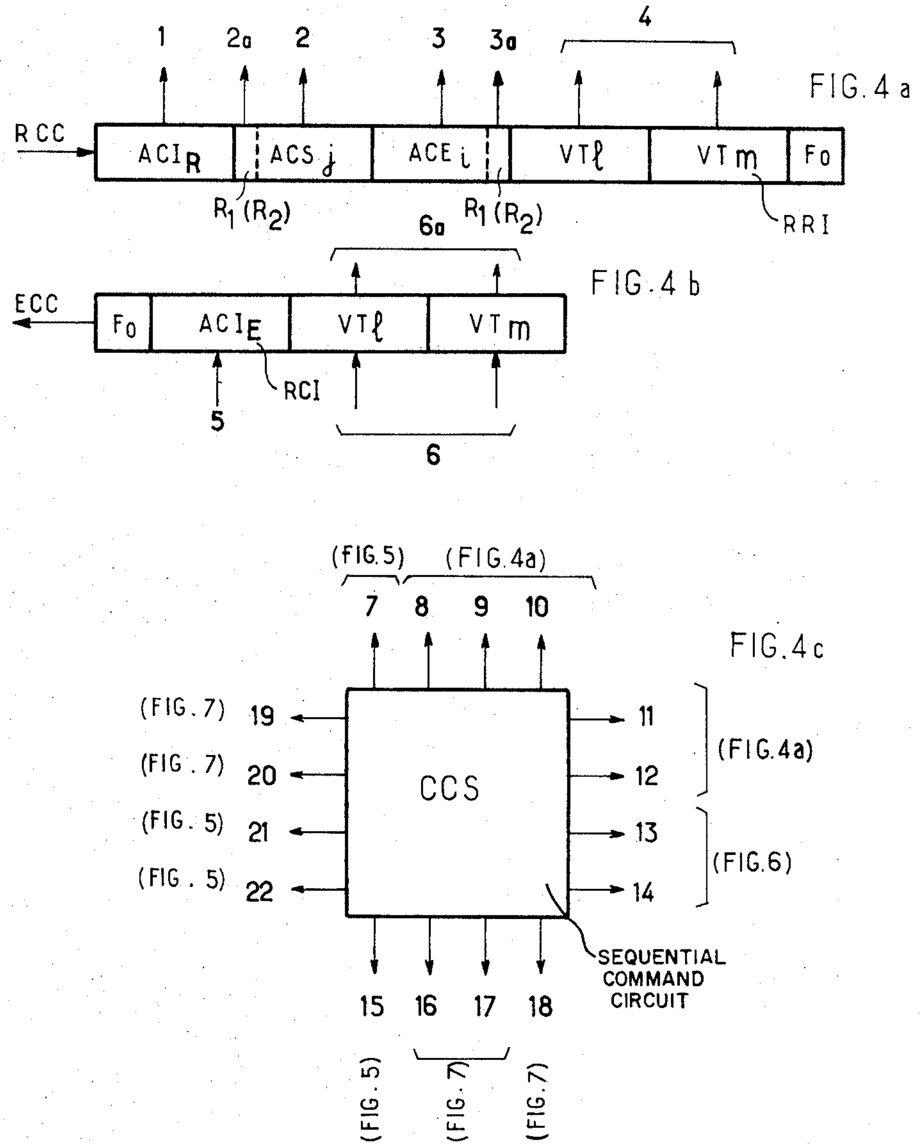
Figure 5:
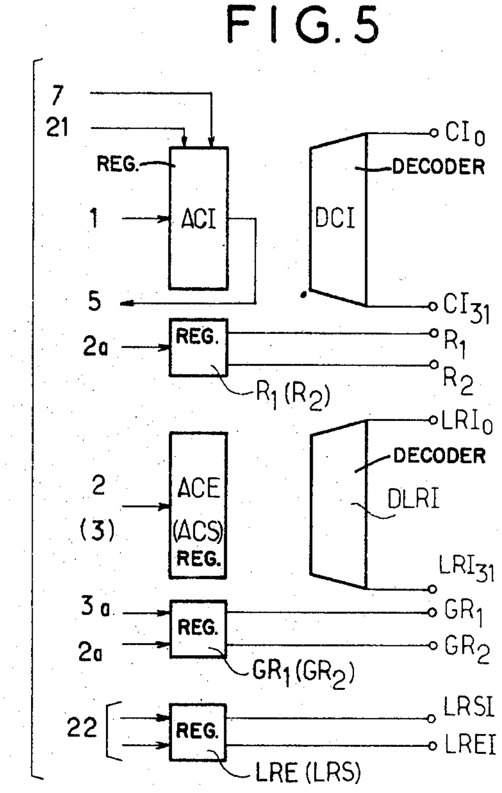
Figure 6:
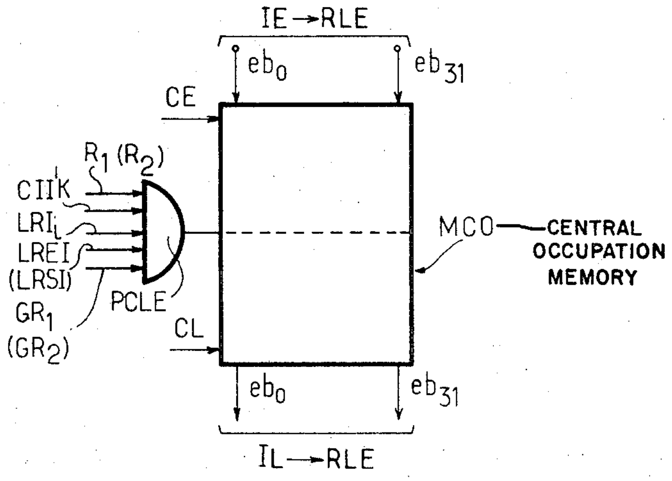

FIG. 4 comprised of 4*a*, 4*b* and 4*c* are schematic diagrams of logical blocks of decision and control;

FIG. 5 is a schematic diagram of a group of registers which permit the addressing of a coded word of 32 binary elements; one binary-decimal decoder being associated or operatively connected to each register;

FIG. 6 is a schematic diagram of the occupancy memory; and

Figure 7:
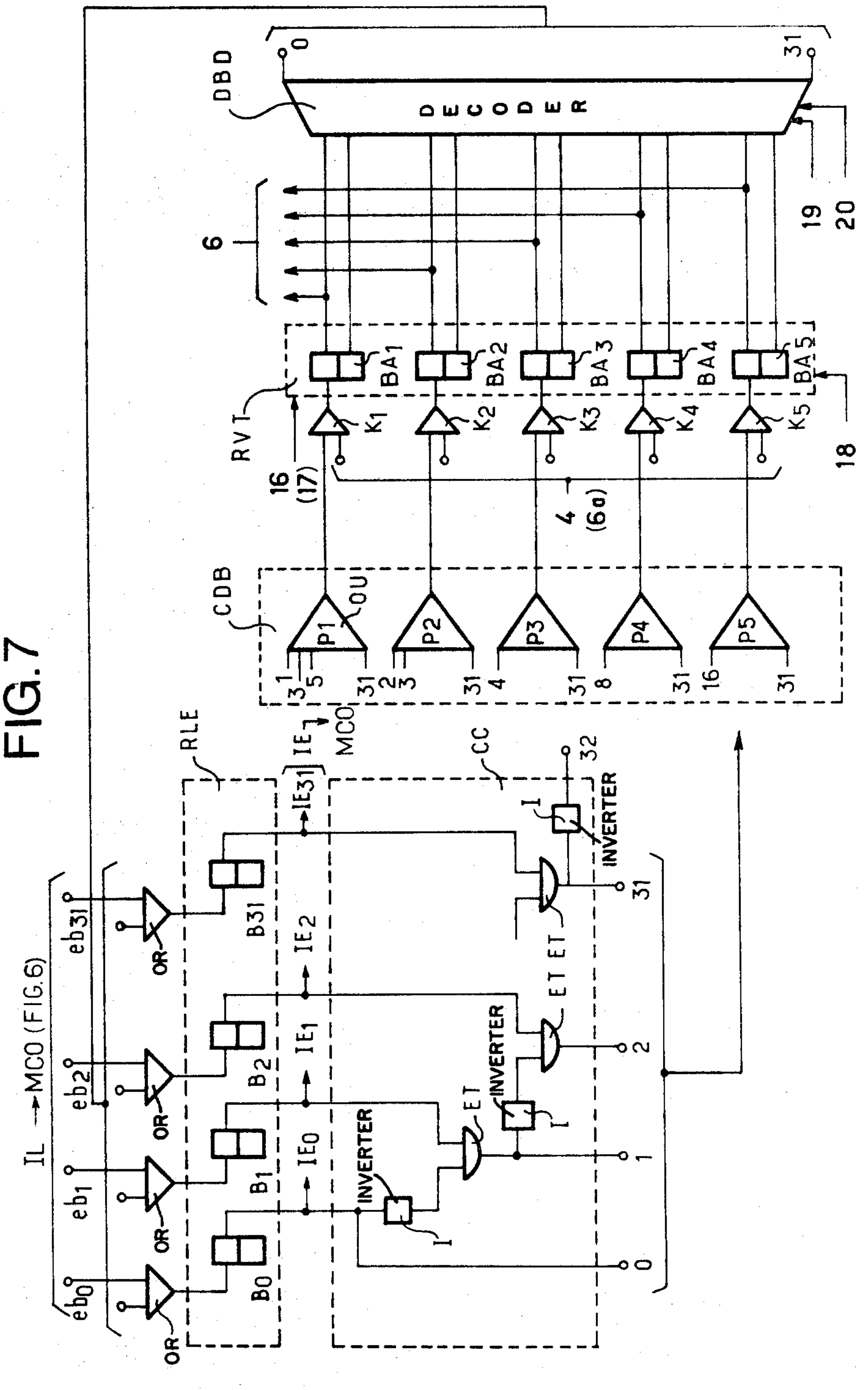

FIG. 7 is a schematic circuit diagram of a reading-writing register, a selection circuit and a time channel register such as described in the aforementioned second U.S. application.

Figure 1A:
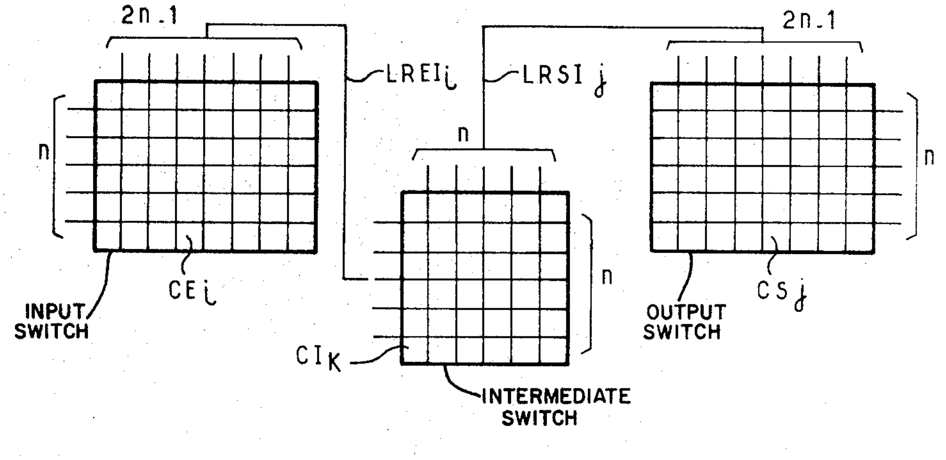

FIG. 1*a* represents the arrangement of a time connection network of the non-blocking type, such as described in FIG. 1 of the above-mentioned first U.S. application. In a structure of this type, any input switch CE*i* comprises $n$ inputs and $2n - 1$ outputs, an intermediate switch CI*k* comprises $n$ inputs and $n$ outputs, and an output switch CS*j* comprises $2n - 1$ inputs and $n$ outputs. In the case of FIG. 1*a*, the intermediate switch CI*k* is connected to the input switch CE*i* by means of the intermediate incoming network line LREI*i* and to the output switch CS*j* by means of the intermediate outgoing network line LRSI*j*.

Figure 1B:
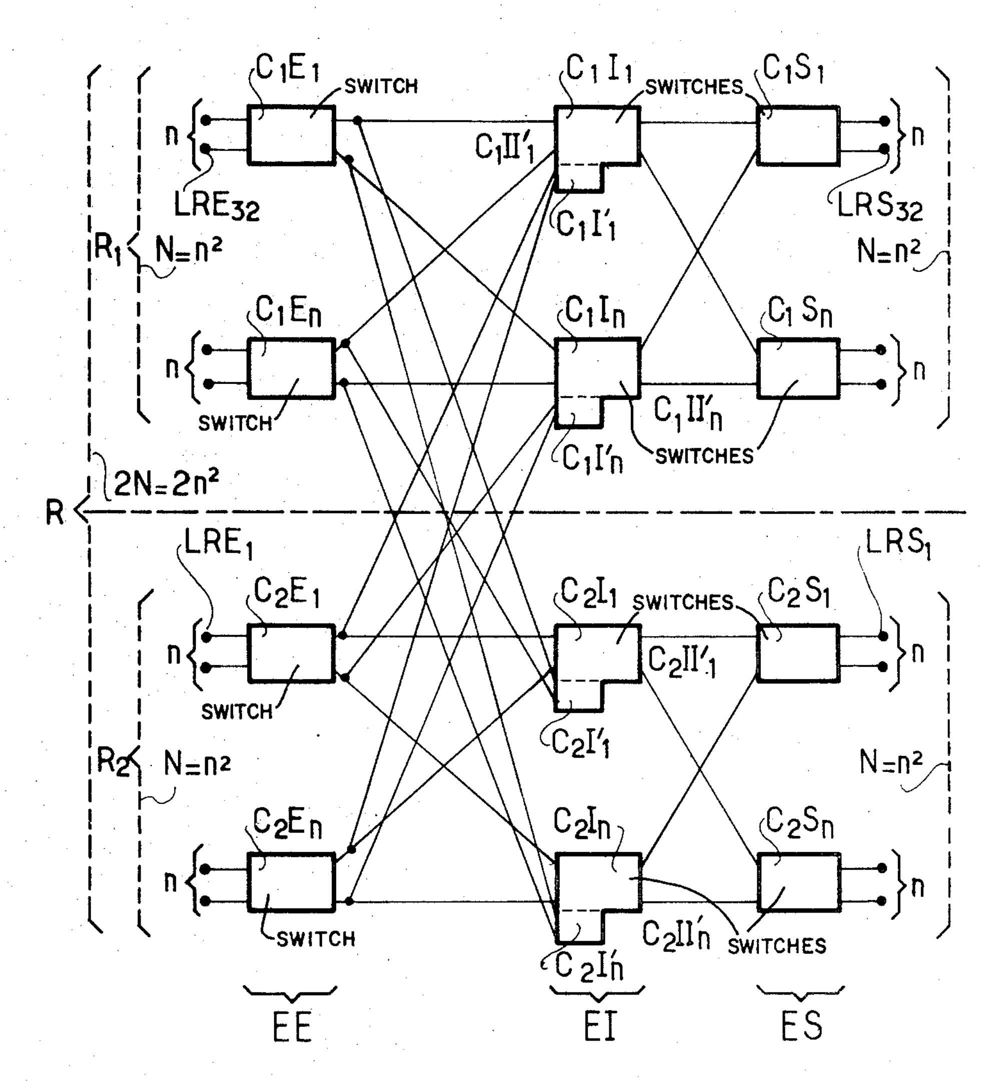

In testing for a free path through the network one knows the caller and the person being called and consequently the switches CE*i* and CS*j* to which they are connected. It is therefore a question of finding an intermediate switch CI*k* having a free time channel on the incoming network line LREI*i* and a free time channel on the outgoing network line LRSI*j*. The path finding test consists in effecting this operation successively on all of the intermediate switches starting from the first one CI1. FIG. 1*b* is a symbolic representation of a time connection network with three stages, such as described in the aforementioned third U.S. application.

In FIG. 1*b* a three stage connection network R has $2n^2$ network lines composed of two networks R1 and R2 with $n^2$ network lines each, and is composed of an input stage EE, an intermediate stage EI and an output stage ES, each network being identical to the network of FIG. 1. The input stage of the network R1 comprises $n$ switches C1 E1 to C1 E*n*; and the input stage of the network R2 comprises $n$ switches C2 E1 to C2 E*n*. The intermediate stage of the network R1 comprises n principal switches C1 I1 to C1 I*n* and $n$ auxiliary switches C1 I'1 to C1 I1*n*, these switches having the same outputs as those of the corresponding principal switches.

The intermediate stage of the network R2 comprises *n* principal switches C2 I1 to C2 I*n* and *n* auxiliary switches C2 I'1 to C2 I'*n*, these switches having the same outputs as those of the corresponding principal switches. The output stage of the network R1 comprises *n* switches C1 S1 to C1 S*n;* the output stage of the network R2 comprises *n* switches C2 S1 to C2 S*n*.

The outputs of the input switches of the network R1 are connected to the inputs of the principal intermediate switches of the network R1, as well as to the inputs of the auxiliary intermediate switches of the network R2; likewise the outputs of the input switches of the network R2 are connected to the inputs of the principal intermediate switches of this network R2 as well as to the inputs of the auxiliary intermediate switches of the network R1. In a general fashion, the links or connections between the output registers of C1 E1 to C1 E*n* with the input registers of C1 I1 to C1 I*n* are provided in accordance with the aforementioned first U.S. application, and the same holds true for the links or connections between C1 E1 to C1 E*n* and C2 I'1 to C2 I'*n*, for the links or connections between C2 E1 to C2 E*n* with C2 I1 to C2 I*n* and for the links or connections between C2 E1 to C2 E*n* with C1 I'1 to C1 I'*n*. The connections between the intermediate switches and the output switches do not pose any problem; the outgoing network lines of the switches C1 I1 to C1 I*n* and C2 I1 to C2 I*n* are common to the auxiliary switches C1 I'1 to C1 I'*n* and C2 I'1 to C2 I'*n*, and the links are provided in accordance with the aforementioned first U.S. application.

In this example, all of the switches are of square configuration; they each have *n* inputs and *n* outputs, but it is equally possible to have networks R1 and R2 comprising *p* input switches having *n* incoming network lines and *m* outgoing network lines, which necessitates for use of *m* intermediate switches with *p* incoming lines and with *p* outgoing lines, the *p* output switches having *m* incoming lines and *n* outgoing lines.

Figure 2:
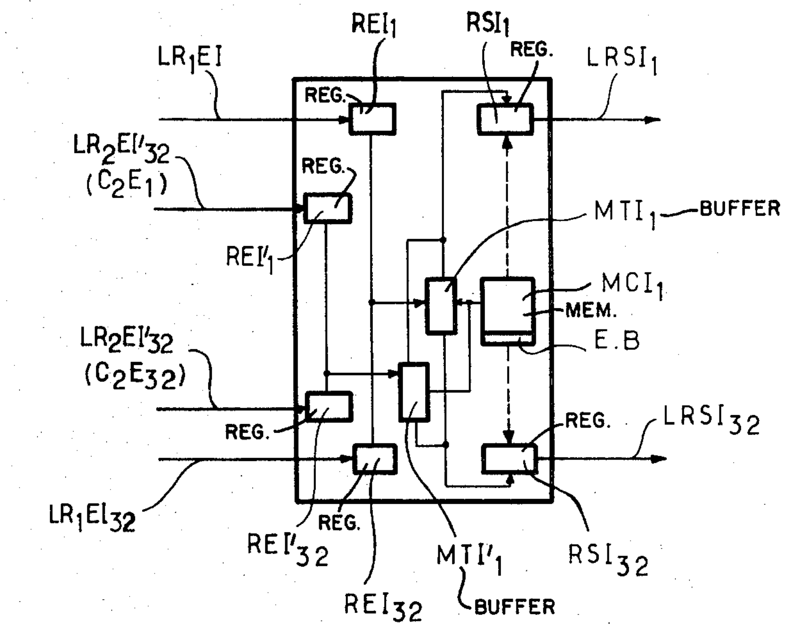
FIG. 2 is a schematic block diagram of the internal structure of an intermediate switch of the network shown in FIG. 1*b*.

FIG. 2 is a diagram of the intermediate switch C1I'1 described in FIG. 1*b* and in the aforementioned third U.S. application, and in the particular case of a blocking network utilizes at each stage 32 switches with 32 network lines for the input and output switches and with 64 network lines for the intermediate switches. Such an intermediate switch comprises : 32 input registers REI1 to REI32, each of these registers being connected to a different input switch of the network R1, of which the intermediate switch C1I'1 is part, by means of a network line such as LR1EI*i;* 32 input registers REI'1 to REI'32, each of these registers being connected to a different input switch of the network R2, of which the intermediate switch C1I'1 is not part, by means of a network line such as LR2 EI*i;* and, 32 output registers RSI1 to RSI32, each output register being connected to a different output switch of the network R1 by a network line such as LRSI*j*.

Furthermore, operatively connected to the 32 input registers REI1 to REI32 is a buffer memory MTI1; associated to the 32 input registers REI'1 to REI'32 is a buffer memory MTI'1; and, to the 32 output registers there is associated a control memory MCI1. The buffer memories each comprise 32 elementary memories (one for each network line) comprising 32 words (one per time channel), each word being formed or made up of several binary elements; and the same holds true for the control memory MCI1, one binary element (e.b.) per word of which allows for addressing in memory MTI1 or MTI'1.

For the purpose of greater facility in the description, reference will be had hereinafter to the particular case of a blocking network R composed of two blocking networks R1 and R2, each utilizing 32 switches with 32 network lines in each of the stages thereof.

Figure 3:
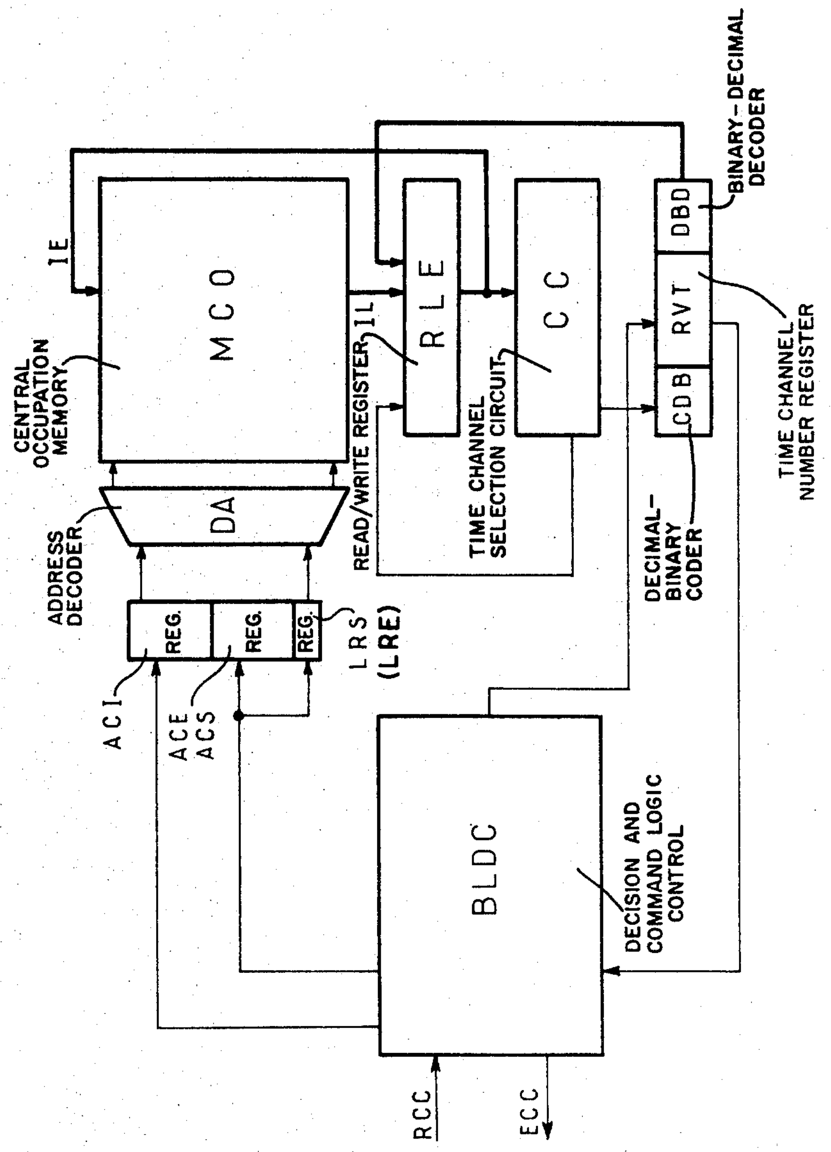
FIG. 3 is a principal block diagram of a central memory for storing occupancy and associated logical functions according to the aforementioned second U.S. application.

FIG. 3 is a functional diagram of the central memory which stores the states of occupancy and the associated or coordinated logical functions such as described in the aforementioned second U.S. application. A control block BLDC provides logical functions of decision and control. Associated therewith is an assembly of registers for addressing words of the memory which includes a part ACI having five binary elements corresponding to the address of the intermediate switches or the number thereof; a part ACE having five binary elements corresponding to the address of the input or output switches to be connected; in other words, to the number of the intermediate network line which is used for the link or connection; and a part LRS or LRE having a single binary element indicating whether an incoming network line in the intermediate switch (LREI) or an outgoing line of the intermediate switch (LRSI) is involved. An address decoder DA is provided for the purpose of furnishing in the decimal system the intermediate switch number and the number of the intermediate incoming network line from the binary information received. A central memory block MCO of 4,096 words with 32 binary elements storing occupancy data is connected to the output of address decoder DA and to the input of a reading and writing register RLE. A circuit CC for selecting the time channel of the first free binary element (zero element) starting from the left of the register RLE and for coding in binary the decimal order or sequence of this binary element (five binary elements for the 32 positions being possible) is connected to the output of the register RLE. A register of the time channel number RVT connected to an output of the control block BLDC is associated with a decimal-binary coder CDB and a binary-decimal decoder DBD.

The information or data forthcoming from the central calculator is received by the input RCC to the control block BLDC and the data sent toward the central calculator is carried by the line ECC. The connections between the memory MCO and the register RLE are provided by 32 wires IL carrying data to be read, and by 32 wires IE carrying data to be written. The other links or connections will be described in further detail in connection with FIGS. 4*a* to 7, and more particularly in connection with FIG. 4*c*.

FIGS. 4*a*, 4*b* and 4*c* are diagrams of the logical control block designated with reference symbol BLDC in FIG. 3. This element comprises in fact three parts.

Disclosed in FIG. 4*a* is a unit or assembly of registers for receiving data RRI coming from the central control calculator of the time telephone exchange. This register comprises one of two binary elements FO indicating the function that is to be executed; in other words, either a path finding test, or an erasing of the path occupancy binary element in the case of a release. In the latter hypothetical case, the block BLDC receives (1) the number of the intermediate switch ACIr, (2) the number of the output switch ACSj which determines the number of the outgoing network line LRSIj of the intermediate switch, with one binary element (R1 or R2) indicating whether the output switch is part of network R1 or network R2, (3) the number of the input switch ACEi which determines the number of the incoming network line LREIi of the intermediate switch, with one binary element (R1 or R2) indicating the network R1 or the network R2 to which ACEi appertains, (4) the number of the time channel VT1 of the incoming network line LREIi, and (5) the number of the time channel VTm of the outgoing network line LRSIj.

In the case of a path finding test, the block BLDC receives solely (1) the function FO, (2) the number of the output switch ACS1 with the indication R1 or R2 of the half of the network R to which it belongs and the number of the input switch ACEi, with the indication R1 or R2 of the network to which it appertains, and (3) the path finding test consisting in determining the number ACI and the numbers of VT1 and VTm.

The reference wires 1 carry the number of the ACI switch with five binary elements and are directed toward the register ACI of FIG. 3; the reference wires 2 or 3 designate the number of ACSj or of ACEi with five binary elements and are directed toward the register ACE or ACS of FIG. 3; the register ACEi or ACSj further comprises a supplementary binary element serving for the indication of the network, R1 or R2, to which the switch ACEi or ACSj appertains; and the reference wire 2a carries the indication that the output switch ACSj pertains to R1 or R2. The reference wire 3a carries the indication that the input switch pertains to R1 or R2; this binary element indicates, for example, the network R1 in the position "0" and network R2 in the position "1", and the indication concerning ACSj is transmitted in FIG. 5 to the binary element (R1 or R2) as well as to the register (GR1 or GR2) by means of the wire 2a. The indication concerning ACEi being transmitted by the wire 3a to the register (GR1 or GR2) of FIG. 5.

The reference wires 4 for VT1 and VTm each associated with five binary elements designate one time channel among 32 and are directed toward the register RVT of FIG. 7. The incoming information or data arrives from the central control calculator by way of the wires RCC.

In FIG. 4b, one finds a group of registers for the emission of information or data RCI which are utilized following a path finding test. A register ACIE receives the number of the intermediate switch which has been selected and the numbers of the time channels VT1 and VTm on the network lines LREIi and LRSIj of this intermediate switch. The reference wires 5 are associated with five binary elements which designate the intermediate switch and originate from the register ACI, as shown in FIG. 5. The reference wires 6 relative to VT1 and VTm designate one time channel from among 32 (five binary elements) and originate from the register RVI of FIG. 7.

Disclosed in and apparent from FIG. 4c is a sequential control circuit CCS performing the logical operations for the path finding test and the path release operations. In case of a path finding test, this sequential circuit sets a counting register ACI, as shown in FIG. 5, to zero and transfers the content of ACSj or ACEi of the reception register RRI (FIG. 4a) into a register ACS or ACE, as shown in FIG. 5. It equally carries out all of the operations that will be described in further detail in connection with the operation of the device proposed by the present invention.

The reference wires No. 7 carry the command for the advance of the register ACI shown in FIG. 5. The reference wires No. 8 carry the command for the transfer of the register ACIR (receiption), as shown in FIG. 4a, into the register ACI of FIG. 5, as well as the state of the wire 2a in the binary element (R1 or R2). The reference wires No. 9 carry the command for the transfer of the register ACSj of FIG. 4a into the register ACE or ACS of FIG. 5, as well as the state of the wire 2a in the register (GR1 or GR2). The reference wires No. 10 carry the command for the transfer of the register ACEi of FIG. 4a into the register ACE or ACS of FIG. 5, as well as the state of the wire 3a in the binary element (GR1 or GR2).

The reference wires No. 11 carry the command for the transfer of VT1 (FIG. 4a) into the register RVT of FIG. 7. The reference wires No. 12 carry the command for the transfer of VTm (FIG. 4a) into the register RVT of FIG. 7. The reference wires No. 13 carry the command for reading in the central memory of FIG. 6. The reference wires No. 14 carry the command for writing in the central memory of FIG. 6.

The reference wires No. 15 carry the command for the transfer of the counting register ACI of FIG. 5 into the register ACI (emission) of FIG. 4b. The reference wires No. 16 carry the command for the transfer of the register RVT (FIG. 7) into the register VT1 (emission) of FIG. 4b. The reference wires No. 17 carry the command for the transfer of the register RVT (FIG. 7) into the register VTm (emission) of FIG. 4b.

The reference wires No. 18 give the command for the transfer of the decimal-binary coding outputs into the register RVT (FIG. 7). The reference wires No. 19 give the command for recording or storing "0" in the binary-decimal decoder of the number VT (FIG. 7). The reference wires No. 20 give the command for recording or storing "1" in the binary-decimal decoder of the number VT (FIG. 7).

The reference wires No. 21 give the command for the setting at "0" of ACI (FIG. 5). The reference wires No. 22 give the command for the setting at "0" or for the setting at "1" for the choice between LRE or LRS (FIG. 5).

FIG. 5 shows in greater detail the portion of FIG. 3 relative to the address registers of the central occupancy memory with the binary-decimal decoding. The register ACI (address of the intermediate switch) receives an information in parallel (5 wires) via the input 1 coming from the reception register RRI, FIG. 4a, in the case of a path release operation. In the case of a path finding test, the register ACI can operate as a counting register which allows for counting in the binary system from 0 to 31 in response to the advance command of the sequential circuit according to FIG. 4c provided on the reference wires 7.

The register ACE or ACS (address of the input or output switch in their network) receives information in parallel (five wires) via the input 2 or 3 coming from the reception register RRI, FIG. 4a, either from register ACSj or from register ACE1, depending upon whether one has to test for a free time channel on an outgoing line LRSIj or on an incoming line LREIi.

The register LRE or LRS consists of a single flip flop which, in the "0" position, indicates that what is involved is the word of the occupancy states of a line LREI and which, in the "1" position, indicates that what is involved is the word of the occupancy states of a line LRSI. This register is placed in the "0" state or in the "1" state by means of the sequential circuit CCS, FIG. 4c. Associated or operatively connected with the register ACI is a binary-decimal decoder DCI which translates into the decimal system the number of the intermediate switch. Operatively connected with the register ACS or ACE is a binary-decimal decoder DLRI which translates into the decimal system the number of the intermediate network line. Each of these decoders has 32 outputs CI0 to CI31 for the decoder DCI and LRI0 to LRI31 for the decoder DLRI.

FIG. 6 illustrates more particularly the central occupancy memory MCO. Operatively connected with each of the 4096 words of 32 binary elements of the memory MCO being allocated to the switches ACI is a logical gate with five inputs PCLE for the control of reading or writing of the information contained in this word. The information contained in each of the 4096 words of the memory MCO appears at the output of this memory on the 32 information wires ebo to *eb*31 from which it is transferred into the reading or writing register RLE (wire I1 - FIG. 3).

The inputs of the gate PCLE consist of (1) the output R1 or R2 of the binary element (R1 or R2) of FIG. 5 identifying the group of the output switch, hence of the intermediate switch to which it belongs, (2) the output of the decoder operatively connected with the register ACI of FIG. 5 identifying the number of the intermediate switch CII'K in the group, (3) the output of the decoder operatively connected with the register ACE or ACS of FIG. 5 identifying the number of the network line LRI whose number is determined by the number *i* or *j* of ACEi or ACSj, (4) the output of the register LRE or LRS of FIG. 5 indicating whether one is testing an incoming or an outgoing network line LREI or LRSI, (5) the output GR1 or GR2 of the register (GR1 or GR2) of FIG. 5 identifying the number of the group of the input or output switch. When an outgoing network line is tested, R1 or R2 and GR1 or GR2 contain the same information in view of the fact that the outputs of one intermediate switch are connected only to the output switches of the same group.

The central occupancy memory MCO thus contains 4096 words with 32 binary elements. It has at the output 32 wires of data for reading from the memory, and it has at the input 32 wires of data to be written in the memory. The wires IL for the reading of the data constitute the inputs of the reading-writing register, and the wires IE carrying the data to be written constitute the outputs of the reading-writing register (see RLE, FIG. 3).

The operations of reading and writing are carried out by means of the same gate having five addressing inputs, and by means of a general command, either or reading or writing. This method of reading or writing is utilized either in the time memories with ferrite cores, or in time memories with semiconductors. The wires 13 relative to the general reading command CL come from the sequential control circuit, as shown in FIG. 4c; and the same is true in an analogous fashion for the wires 14 relative to the general writing command CE.

FIG. 7 illustrates more particularly the reading and writing register RLE, the selection circuit CC, the time channel register RVT with the decimal-binary coder CDB and the binary-decimal decoder DBO which are operatively connected therewith.

The reading-writing register RLE comprises 32 flip flops B0, B1 . . . B31; each of these flip flops may be operated with the aid of an OR gate, either from the wires IL relative to the data read from the occupancy memory MCO (FIG. 6), in which case the 32 flip flops are positioned simultaneously, or in response to a signal derived from the binary-decimal decoder DBD indicating the time channel number of the time channel in FIG. 7. In this latter case, the signal is individual, which means that only flip flop is positioned, namely the one which is designated by the decoder DBD; and the positioning is determined by the setting at "1" or at "0" depending upon whether it is intended to mark the occupancy or the release of a time channel.

The choice or selection circuit CC comprises 32 inputs (which are the 32 outputs of the register RLE) and 33 outputs. The outputs 0 to 31 indicate the number of the first free time channel starting from the left and from the output 32 which indicates that no time channel is free on the intermediate network line being tested. The choice or selection circuit CC thus has the object of indicating or marking the first free time channel of a line being tested. This selection circuit consists of a network with AND gates and inverters I in cascade; the output "0" indicating that the binary element "0" is at zero, and that thus the time channel VTD is free; the output "1" indicates that the binary element "0" is at "1" and that therefore the binary element "1" is at zero; the time channel VT1 thus being free, and so forth up to the output 31 which indicates that all of the time channels of VT0 to VT30 are occupied but that VT31 is free. The output 32 indicates, as has been said, that all of the time channels are occupied or busy.

The writing wires IE1, IE2, IE3, . . . IE31 are shunted with the outputs of the reading and writing register RLE and constitute the wires IE for writing in the memory MCO the states of occupancy of the paths.

The decimal-binary coding circuit CDB consists of five OR gates from P1 to P5. It permits coding in the binary system with five binary elements a decimal number comprised between 0 and 31. The inputs of the OR gates consist of the outputs of the selection circuit CC for the free time channel. A coding network is made up in the following manner by shunting the outputs 0 to 31. For the gate P1 outputs 1, 3, 5, 7, 9, 11, 13, 15, 17, 19, 21, 23, 25, 27, 29 and 31 are connected. For gate P2 2, 3, 6, 7, 10, 11, 14, 15, 18, 19, 22, 23, 26, 27, 30 and 31 are connected. For gate P3 outputs 4, 5, 6, 7, 12, 13, 14, 15, 20, 21, 22, 23, 28, 29, 30 and 31 are connected. For gate P4 outputs 8, 9, 10, 11, 12, 13, 14, 15, 24, 25, 26, 27, 28, 29, 30 and 31 are connected. For gate P5 output 16, 17, 18, 19, 20, 21, 22, 23, 24, 25, 26, 27, 28, 29, 30 and 31 are connected.

Each of the five gates exhibit at the output the state 0 or 1. One has therefore at the output a binary number of five binary elements providing the binary number of one free time channel.

The time channel register RVT consists of five flip flops BA1, BA2 . . . BA5. It receives its information either from five OR gates P1 to P5 of the decimal-binary coding circuit CDB, or from the registers VT1 or VT*m* which are part of the register RRI for receiving information or data (see FIG. 4*a*). In the latter case it is the wires 4 which assure the connection between RRI and RVT. The inputs in the register RVT thus consist in fact of the outputs of the five OR gates K1 to K5. The outputs of RVT — while constituting the inputs of the binary-decimal decoder DBD — also have shunts which constitute the wires 6, these wires constituting the inputs of the registers VT1 and VTm of the information emission register RCI (see FIG. 4*b*).

The binary-decimal decoder DBD associated with the register RVT has its outputs from 0 to 31 which constitute the inputs of the reading-writing register RLE in FIG. 7. It is the object of this decoder to designate the flip flop of the register RLE to be positioned at "0" or at "1" prior to the recording or storage of the entire word with 32 binary elements in the central occupancy memory MCO by means of the wires IE. This control for recording "0" or for recording "1" comes from the sequential control circuit CCS (FIG. 4*c*); the wire 19 provides the control for recording the "0", and the wire marked 20 gives the command for recording the "1."

OPERATION FOR PATH FINDING TEST

The operation will now be described in the case of the path finding test, this information being provided by the central calculator on the register FO of FIG. 4*a*.

The logical block for decision and command BLDC equally receives from the central calculator the number of the output switch ACS*j* (R1 or R2, wire 2*a*) and the number of the input switch ACE*i* (R1 or R2, wire 3*a*) (FIG. 4*a*), the path finding test consisting in determining the number of the intermediate switch ACI and the numbers of VT1 and VT*m*.

The operation of the assembly (FIGS. 1 and 3) is as follows:

At the beginning of the test, the logical block for decision and command (BLDC) records or stores the value "0" in the portion ACI of the address register of the central occupancy memory MCO and records the state or condition of the wire 2*a* in the binary element (R1 or R2). In order to read the word of MCO corresponding to the line LREI*i*, the logical block BLDC also records or stores the number "1" in the portion ACE of the address register, and records or stores "0" (for example) in the binary element corresponding to the third portion of the address register, indicating that what is involved is an incoming network line LREI, and records or stores in the binary element (GR1 or GR2) the state of the wire 3*a* indicating whether ACEi appertains to R1 or R2.

The number *i* is thus determined by the number of the input switch to be connected with an intermediate switch, and the number *j* is determined by the number of the output switch to be connected to an intermediate switch. The direct relation between the number *i* of the input switch and the number *i* of the incoming network line LREIi, as well as the number *j* of the output switch and the number *j* of the outgoing network line LRSI*j* is due to the structure of the connection network or system and to the relationship for establishing connections between the intermediate switches and the input and output switches, as has been described in the aforementioned first U.S. application.

If the network line LREI*i* of the intermediate switch CI1 contains a free time channel, the control or command logic BLDC records or stores the number *j* in the portion ACS of the address register and records in the binary element (GR1 or GR2) the state of the wire 2*a* indicating whether ACS*j* belongs to R1 or to R2, and records at "1" the 11th binary element in order to indicate that what is involved is the test of a line LRSI, after having transferred into a buffer register of the logical block BLDC the coded time channel number in the register RVT and this number is 1.

If the line LRSI*j* of the switch CI1 contains a free time channel, the logic BLDC transfers the new content of the register RVT into a buffer register of BLDC and this number is *m;* the itinerary test is completed after the occupancy binary elements of the time channels having been taken have been positioned at "1". This operation is controlled by the logic of BLDC by the transfer of the numbers 1 then *m* of the time channels to be marked "occupied" in the register RVT which excites the decoder and allows for positioning at "1" the binary element whose number, coded in binary form, is found in RVT.

If the logic of BLDC does not find a free time channel, either on LREIi, or on LRSI*j* of the switch CI1, it commands the advance of the register with five binary elements (ACI) which will then contain the number 1 corresponding to the address of the intermediate switch CI2 and the previously described procedure will begin again with the recording of the number *i* in ACE and the indication R1 or R2 in GR1 or GR2 (wire 3*a*), and of "0" in the 11th binary element, then of the number *j* in ACS and the indication R1 or R2 in GR1 or GR2 (wire 2*a*) and of "1" in the 11th binary element.

As long as no free time channel is found either on the line LREI*i* or on the line LRSI*j* of an intermediate switch, the logic BLDC causes the number of the intermediate switch being tested to advance by means of an advance command from the five binary element register (ACI) until this register contains the number 31 corresponding to the address of the intermediate switch CI32. If the switch CI32 does not have a free time channel on either line LREI*i* or on line LRSI*j*, the path finding test is stopped. There is no path possible and the communication cannot be established; the calling subscriber receives the indication of the busy condition.

A more detailed description of the path finding test will be given hereunder, the sequential control circuit CCS then bringing about the following operations (FIGS. 4 to 7). First, the command is applied for setting the register ACI at "0" and the transfer of the state of 2*a* into (R1 or R2) (wires 21 - FIG. 5). The transfer of the number of ACSj is effected with the indication R1 or R2 into ACS or ACE and (GR1 or GR2) (wires 2 and 2*a* – FIG. 5). Then, the command for setting the register LRS or LRE at "1" depending upon whether the number of ACS or of ACE is transferred by wires 22, FIG. 5. The command for reading the word of the central memory is thus designated (wires 13, CL, FIG. 6).

The reading result placed on the register RLE after the test of the first free binary element commands the transfer of the output of the decimal-binary coding network CDB (FIG. 7) into the register RVT (wires 18, FIG. 7); on the other hand, if no binary element is free, it controls or commands the advance of the counter ACI (wires 7 - FIG. 5) then commands once again the reading of the word of the designated memory (wires 13 - FIG. 6).

One free time channel on LRSI*j*

In this case where a time channel has been found to be free on LRSI*j*, the sequential control circuit CCS commands by way of the wires 17 the transfer of the register RVT (FIG. 7) on the registers VT*m* of the emission register RCI (FIG. 4*b*); this transfer is effected with the aid of the wires 6. Thereafter, the number of ACE*i* with the indication (R1 or R2) of the register RRI (FIG. 4*a*) is transferred into the register ACS or ACE and into (GR1 or GR2) of FIG. 5 by means of the wires 3 and 3*a;* and the flip flop (LRS or LRE) is positioned at "0" so as to make it possible to proceed with the free time channel test on the network line LREI*i*.

The sequential control circuit CCS then commands the reading of the word of the central memory designated by the new address, and if a binary element of this word is set at "0", i.e., if a time channel is free, there occurs a command for the transfer of the output of the decimal-binary coder CDB into the register RVT (FIG. 7), then the transfer of the register RVT into the register VT1 of the emission register (FIG. 4*b*) in a manner analogous to what has been disclosed in connection with VT*m*. Lastly, there takes place a transfer of the data in the register ACI (FIG. 5) by means of the wires 5 into the emission register ACI (FIG. 4*b*).

No free time channel

If no time channel is found to be free, the sequential circuit CCS commands the advance of the counter ACI (FIG. 5) by means of the wires 7, and the operations will begin once again with the new content of the register ACI, that is to say, for the following intermediate switch. The commands are then repeated, command of transfer of ACS*j* into ACS or ACE, etc.

One free time channel on LRSI; and on LREIi

In the case that a time channel has been found to be free both on LRSI*j* and on LREI*i*, the sequential control circuit CCS commands the transfer of VT1 of the emission register (FIG. 4*b*) into the register RVT by the wires 6*a*, the setting at "0" of the flip flop LRS or LRE (FIG. 5), and the transfer of the number of ACE*i* and of the group R1 or R2 of the reception register RRI (FIG. 4*a*) into the register ACS or ACE (FIG. 5) and (GR1 or GR2). The reading of the word of the central occupancy memory being designated is then accomplished. The setting at "1" of the binary element designated by the register RVT and the associated or coordinated decoder DBD into the reading-writing register RLE then occurs followed by the recording or storage in the central memory at the same address the new content of the reading-writing register. The transfer of the register ACS*j* with the indication R1 or R2 of the reception register RRI (FIG. 4*a*) into the register ACS or ACE (FIG. 5), and (GR1 or GR2) is then accomplished followed by the setting at "1" of the flip flop LRS or LRE and the reading of the word of the central occupancy memory MCO designated by this new address. The transfer into RVT (FIG. 7) of the register VT*m* of the emission register by means of the wires 6*a* and the control for setting the binary element in the reading-writing register at "1" designated by the register RVT and the associated or coordinated decoder DBO are effected, followed by the recording or storage in the central memory at the same address of the new content of the reading-writing register.

The sequential control circuit CCS then commands the transfer to the central calculator by means of the wires ECC (FIG. 4*b*) of the information contained in the emission register RCI, namely the function of the positive itinerary test; i.e., number of VT1 on LREI*i* number of VT*m* on LRSI*j* the central calculator already having available the numbers of the switches ACS*j* and ACE*i*, in other words the numbers of LRSI*j* and LREI*i*. If the test is negative, the transferred function indicates that no itinerary is available and the content of the register is nil (ACI, VT1, and VT*m*).

Operation Regarding Path Release

Another example for the operation of the device proposed by the present invention will be described hereunder for the case of the release of a path. After the reception by the block BLDC of the function FO indicating path release, the reception register RRI (FIG. 4*a*) receives the necessary data for execution; that is to say the address ACI of the intermediate switch, the addresses ACS*j* and ACE*i* with indication of the Group R1 or R2 by the wires 2*a* and 3*a* of the switches having the network lines LRSI*j* and LREI*i* in junction with ACI, and the numbers of time channels VT1 and VT*m* of the time channels to be released on LREI*i* and LRSI*j*.

The itinerary release operation, after the words have been erased from the control memories MCS, MCI and MCE, consists in proceeding with erasing the occupancy binary elements in the central memory MCO. The words in the control memories are released without causing the intervention of the logical block for decision and command BLDC; but on the other hand, BLDC does intervene for purposes of the release or disengagement of the memory MCO.

The operation of the assembly (FIGS. 1 and 3) is as follows. The logical block BLDC transfers the number of CI*k*, i.e., the number *k* in the portion ACI of the address register, and the state of the wire 2*a* to register (R1 or R2), then the number *j* in the portion ACS, and the state of the wire 2*a* to (GR1 or GR2), sets the 11th binary element at "1" in order to release or disengage LRSI*j*, and transfers the number m (number of VT*m*) into the th RVT. The logical block BLDC first commands or brings about the reading of the designated word of MCO, then the erasing (setting at "0") of the binary element designated by *m*, and finally the re-writing of the new content of the word which has been read. Thereupon, the logical block BLDC proceeds to release VT1 on line LREIi of CIk and therefore, without changing the content of ACI, transfers the number *i* to ACE, and the state of the wire 3*a* in (GR1 or GR2) sets the 11the binary element at "0" and transfers the number 1 (number of VT1) into RVT. The logical block BLDC then commands or brings about the reading of the word designated of MCO, then the erasing of the binary element designated by 1 and finally the rewriting of the new content of the word which has been read.

A more detailed description concerning the operation in connection with the path release operation will be given hereinafter; the sequential control circuit CCS causes the following operations to be executed (FIGS. 4 to 7).

Release of the time channel VT1 of LREIi of the intermediate switch CIk

Transfer of the content of ACI of the reception register RRI (FIG. 4*a*) into the register ACI (FIG. 5) is effected by means of the wires marked 1, and transfer of the state of the wire 2*a* to (R1 or R2) is also accomplished. Transfer of ACEIi and of the indication of the group of the reception or receiving register RRI (FIG. 4*a*) in the register ACE or ACS and (GR1 or GR2) (FIG. 5) is effected by means of the wires 3 and 3*a*, followed by transfer of VT1 of the reception register RRI (FIG. 4*a*) in the register RVT of FIG. 7 by means of the wires 4. Then, the flip flop LRS or LRE is set at zero by means of the wires marked 22. A command is generated at this time for reading the word of the central occupancy memory MCO designated by the address in place in the registers and consecutive transfer of this information in the reading-writing register LRE (wires marked 13, FIG. 6, and transfer FIG. 7), and a command for setting at "0" the binary element of the reading register RLE designated by the register RVT and the associated or coordinated decoder BDB (FIG. 7) by means of the wires 19 is generated. Finally, a command is generated for recording or storing in the central memory MCO at the same address the new content of the register RLE; this command is given by the wires marked with numeral 14 (FIG. 6), and the transfer from RLE into MCO is effected with the aid of the wires IE and RLE (FIG. 7). Release or disengagement of the time channel VTm of LRSIj of the intermediate switch CIk is accomplished by means of operations that are analogous to the release or disengagement of VT1. The first step is the transfer of ACS*j* and of the indication of the group to the register ACS or ACE and (GR1 or GR2) (FIG. 5) by means of the wires 2 and 2*a*. Next, the transfer of VT*j* of the reception or receiving register RRI (FIG. 4*a*) to the register RVT of FIG. 7 is accomplished by means of the wires 4, followed by the setting at "1" of the flip flop LRS or LRE (FIG. 5). Then, a command is generated for reading the word of the central occupancy memory MCO designated by the address in place in the registers, and consecutive transfer of this information into the reading-writing register RLE (wire 13 - FIG. 6, and transfer, FIG. 7). After this, a command is generated for setting at "0" the binary element of the reading register RLE designated by the register RVT and the associated or coordinated decoder DBD (FIG. 7), in other words, the binary occupancy element of the time channel VT*m*. A command is then generated for recording or storing in the central memory MCO at the same address the new content of the register RLE; this command is given by the wires 14 (FIG. 6) and the transfer of RLE in MCO is effected with the aid of the wires IE of RLE (FIG. 7).

This group of operations completes the release of a path, be it one from a caller toward a party being called, or from a party being called toward the caller.

It is understood that the present invention is by mo means limited to the embodiment described and disclosed herein which has been given solely by way of example. It is of course possible to modify, more particularly, some of the arrangements shown, or to exchange certain means for other equivalent means without departing from the spirit and scope of the present invention.

What is claimed is:

1. A path finding system for a time division multiplex communication network for providing switching paths for time division multiplex signals transmitted therethrough, comprising:

first and second identical multi-stage connection networks, each including an input stage, an intermediate stage, and an output stage, the input stage of each connection network comprising *p* input time switches having n incoming and m outgoing network lines, the intermediate stage of each connection network comprising *m* intermediate time switches with two *p* inputs and *q* outputs, and the output stage of each connection network comprising *q* output switches with *m* inputs and *n* outgoing network lines, each network line including a plurality of time channels and the switches having the same internal time division switching arrangement, each input time switch of one network being connected to respective inputs of the intermediate time switches of that network and to respective inputs of the intermediate time switches of the other network, each intermediate time switch being connected by means of an intermediate network line with the respective inputs of the output time switches of the network;

central memory means, coupled to the intermediate stages of said first and second connection networks, for storing the busy or free condition of all the time channels of the incoming and outgoing network lines of each time switch in said intermediate stages; and access means, coupled between said central memory means and said intermediate stages, for reading into said memory means the condition of each intermediate time switch and for writing in each intermediate time switch the busy or free condition of each time channel in the incoming and outgoing network lines; and wherein said central memory means includes individual memory portions for said first and second connection networks.

2. Device according to claim 1, wherein said central memory means for the information concerning the states of occupancy of the network includes a block memory comprising 2 ($p \times m$) words of 32 binary elements corresponding to the outgoing network lines of the input time switches, and $2m \times q$ words of 32 binary elements corresponding to the outgoing lines of the intermediate time switches.

3. Device according to claim 2, wherein said acess means includes register means for controlling the addressing of said block memory, the storage location for each word of said block memory being operatively associated with an input gate having several inputs, and characterized in that each of said input gates comprise five inputs connected to said register means and receiving respectively the number of an intermediate time switch, the number of an intermediate line, data discriminating between an incoming and outgoing line, the indication of the group to which the output time switch of an outgoing line belongs, and the indication of the group to which the input time switch of an incoming line belongs.

4. Device according to claim 3, characterized in that said register means includes a register receiving the indication of the number of the output time switch in question comprising six binary elements, one binary element of which corresponding to the first or second network to which the output time switch belongs, this information being transmitted to the gates associated with the words of the block memory.

5. Device according to claim 3, characterized in that said register means includes a register receiving the indication of the designation of the input time switch in question comprising six binary elements, one binary element of which corresponding to the first or second network to which the input time switch belongs, this indication being transmitted to the gates associated with the words of the block memory.

6. Device according to claim 5, characterized in that said register means includes a register receiving the indication of the number of the output time switch in question comprising six binary elements, one binary element of which corresponding to the first or second network to which the output time switch belongs, this information being transmitted to the gates associated with the words of the block memory.

* * * * *